May 28, 1929. G. A. THORNTON ET AL 1,715,017
ELECTRIC WELDING APPARATUS
Filed March 12, 1927 2 Sheets-Sheet 1
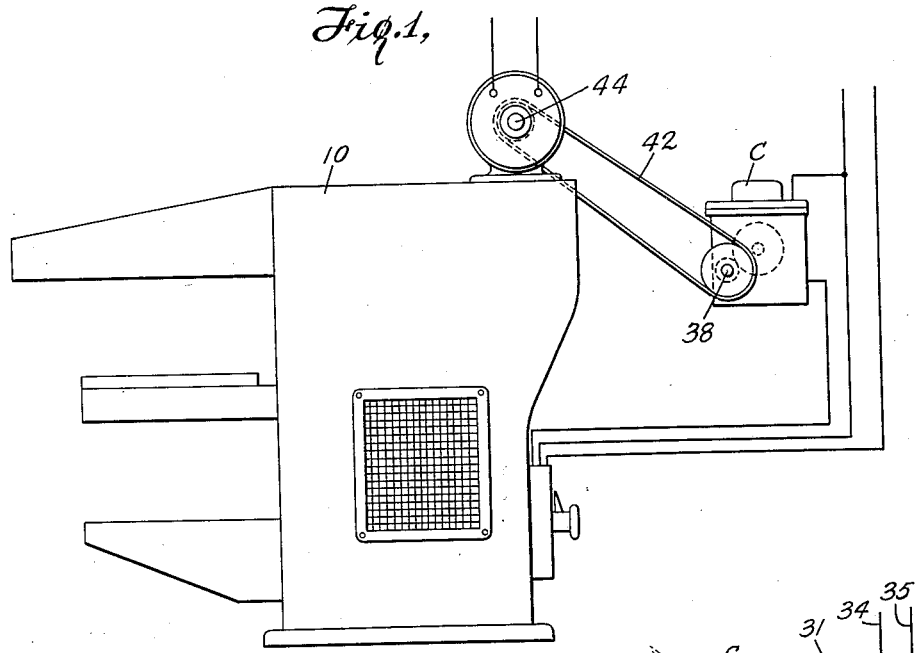
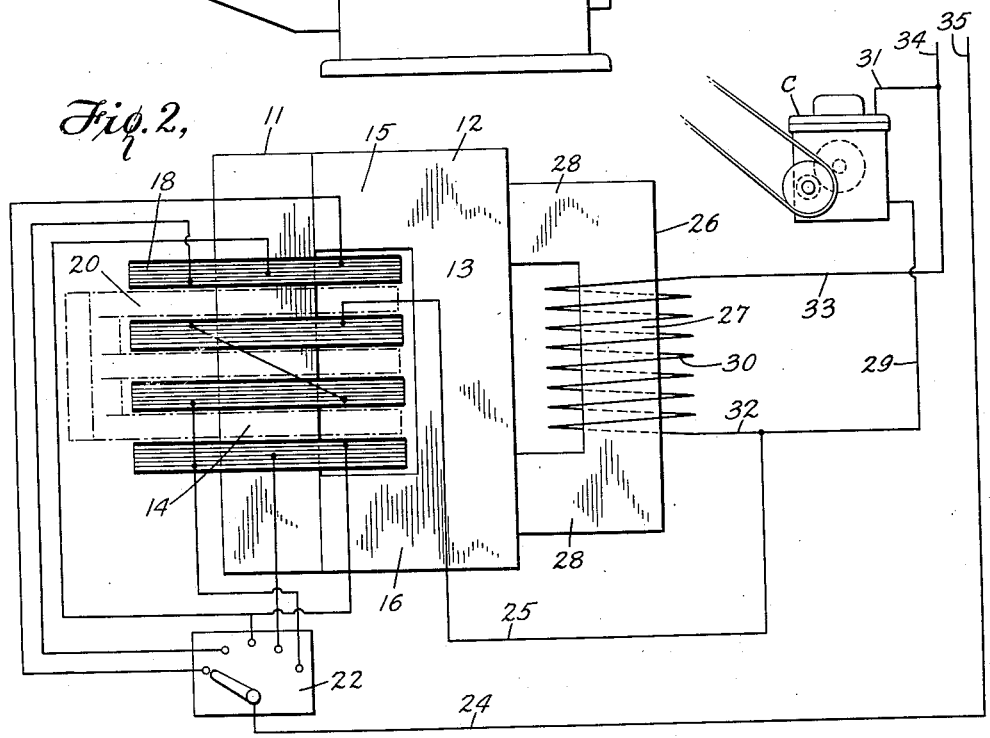
INVENTORS
G. A. Thornton
W. Remington
BY Townsend + Decker
ATTORNEYS May 28, 1929.  G. A. THORNTON ET AL  1,715,017
ELECTRIC WELDING APPARATUS
Filed March 12, 1927  2 Sheets-Sheet 2

INVENTORS
G. A. Thornton
W. Remington
BY Townsend + Decker
ATTORNEYS

Patented May 28, 1929.

1,715,017

UNITED STATES PATENT OFFICE.

GEORGE A. THORNTON, OF SCHENECTADY, NEW YORK, AND WOLCOTT REMINGTON, OF SWAMPSCOTT MASSACHUSETTS, ASSIGNORS TO THOMSON ELECTRIC WELDING COMPANY, OF LYNN, MASSACHUSETTS, A CORPORATION OF MASSACHUSETTS.

ELECTRIC WELDING APPARATUS.

Application filed March 12, 1927. Serial No. 174,779.

This invention relates to alternating current electric apparatus, the invention being illustrated as applied to an electric welding apparatus.

One of the main objects in view during the development of the invention has been the provision of mechanism permitting the rapid varying of the current flow in a transformer without injury to the apparatus or to the work being performed.

More specifically the invention contemplates rapid variation of the current flow in the transformer of welding or other apparatus to an extent such that the reduced current will perform substantially no useful work, the variation being accompanied by no arcing or other severe electrical or mechanical strains.

These and other objects will appear from the following description when considered in connection with the drawings in which:

Fig. 1 is an elevational view of an electrical welding apparatus to which our invention has been applied.

Fig. 2 is an enlarged detail view, diagrammatic in certain respects, of the transformer and controlling device constructed according to our invention.

Figure 3:
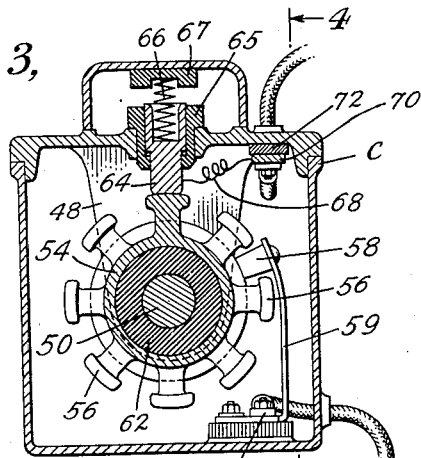
Figs. 3, 4 and 5 are respectively transverse vertical, longitudinal vertical and horizontal sectional views of the circuit controller employed herein.
Figure 4:
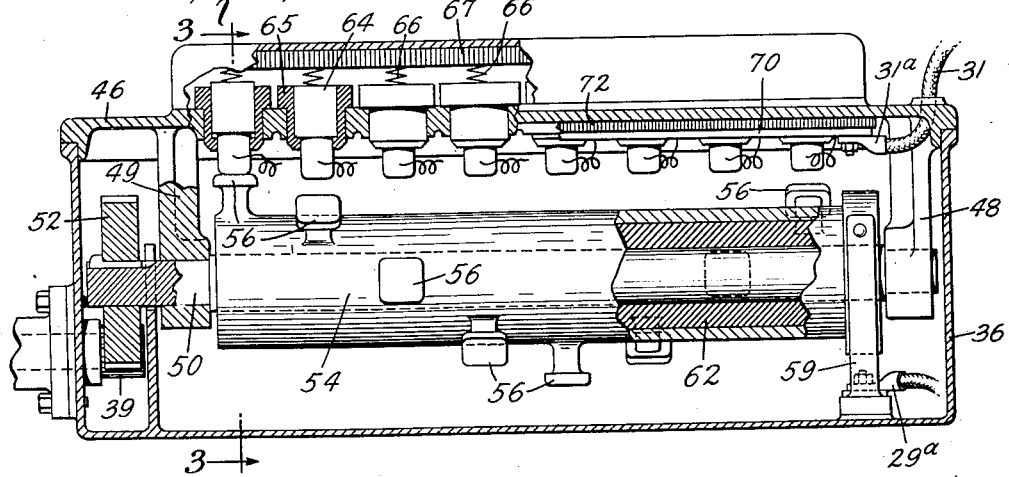
Figure 5:
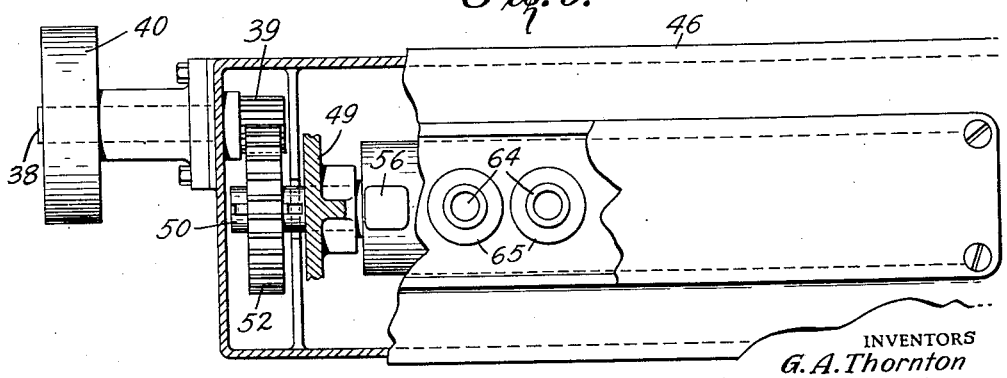

There has been experienced considerable difficulty heretofore particularly in connection with welding apparatus to provide circuit controlling means to vary the current flow in the primary and secondary of transformers in that opening either the primary or secondary circuits produced arcing of a severe character and which was objectionable for various reasons. The mechanism heretofore employed for varying the output of transformers has been objectionable in that it has been physically impossible to interrupt the full current flow with sufficient rapidity to perform all of the useful functions for which such apparatus is intended and may otherwise be used.

According to the present invention provision is made for varying the current flow of the transformer to such an extent that no useful work will be performed by the secondary current between the full current flow conditions, this mechanism being entirely free of the former objections of arcing or the creating of other severe electrical or mechanical strains. We achieve these results by means of the mechanism described below.

Referring now to the details of the drawings, the electric welding apparatus 10 comprises the usual tables for holding the work to be welded and the usual electrodes constituting the terminals of the secondary power circuit of the transformer. These elements of the electric welding apparatus being the usual type are not herein disclosed in detail, it being understood that the invention is applicable to various types of welding or other electrical apparatus embodying one or more alternating current transformers.

The alternating current transformer 11 is mounted within the welding apparatus 10 and comprises the magnetic core 12 formed with the limbs 13 and 14 and yokes 15 and 16 forming a complete magnetic circuit for the transformer. The primary windings 18 and secondary windings 20 may be mounted upon the limb 14 as shown. The primary coils 18 have a plurality of outlets connected respectively by suitable conductors with the different points of the five-point regulator 22, the connections with the regulator being such that for different adjustments of the regulator the number of turns in the primary coils 18 may be adjusted to correspondingly regulate the secondary voltage. Current is supplied to the main primary coils 18 through suitable conducting lines 24 and 25 as described in detail below.

The mechanism herein provided for controlling the current flow in the coils of the transformer 11 comprise an auxiliary magnetic core element 26 which is formed with one limb 27 and the two yoke portions 28 placed in magnetic conducting relation to the main core 12, the core element 26 in the present embodiment being applied to the limb 13 of the main core to form a composite core similar to the well known shell-type transformer core. Magnetic lines of force are excited in the core element 26 by means of an auxiliary primary coil 30 to which current is supplied through the conductors 32 and 33. The branch lines 25 and 32 may remain in closed circuit condition with respect to the main power lines 34 and 35 at all times through the coil 30 and conductor 33, means being provided for short-circuiting or shunting the current around the auxiliary coil 30 through the conductors 29 and 31 to negative the exciting influence of this coil as described below.

The welding apparatus disclosed in Figs. 1 and 2 and described above is particularly designed for making a series of welds in rapid succession, under certain conditions the successive welds being made as rapidly as sixteen or more times per second. It will thus be seen that something more than a make and break device for the primary or secondary welding circuits is required before this apparatus can be successfully operated. The circuit making and breaking device constructed as described below has been found to operate to give uniformly satisfactory results with even higher speed operation than that indicated above.

The circuit controller indicated generally at C is formed with a body casing 36 having an opening to receive the terminal 29$^a$ of the conductor 29 and having an additional opening through which the rotatable shaft 38 passes, the shaft 38 carrying the gear wheel 39 and power wheel 40 shown in the present instance as a pulley wheel operated by the belt 42 from the motor actuated power device 44 of any usual or preferred type.

The circuit controlling mechanism is preferably mounted upon the cover 46 of the casing 36, the cover being formed of cast iron or other substantial material and having depending bearings 48 and 49 for receiving the rotatable controller shaft 50. This shaft is designed to be rotated by means of the gear wheel 52 rigidly secured upon one end of the shaft 50 and meshing with the power gear 39 so that upon rotation of the latter the shaft 50 will be correspondingly rotated.

The make and break mechanism of the controller comprises a conductor 54 formed with a series of projecting elements 56 spaced circumferentially and longitudnally of the conductor 54, the elements 56 according to the present construction being eight in number and arranged in spiral form about the conductor 54. Current is conducted from the terminal 29$^a$ to the conductor 54 by means of the brush 58 mounted upon the conductor 59 secured to the casing 36 together with the terminal 29$^a$ by means of the bolts 60 or in any other suitable manner. An insulating cylinder 62 is mounted between the shaft 50 and conductor 54 so as to insulate the conductor 54 from the housing 36.

The projecting contactors 56 are designed to successively engage the contact members 64. In the present embodiment the contacts 64 are slidably mounted within the insulating sockets 65, being spring-pressed downwardly by means of the springs 66 engaged within the insulating strip 67 mounted in the upper portion of the cover 46. The contact members 64 are each connected, by means of the conductors 68, to the conducting strip 70, the latter being engaged by the terminal 31$^a$ of the conductor 31. A suitable insulating block 72 is mounted between the conducting strip 70 and the housing cover 46 to further prevent short-circuiting within the housing.

The circuit controller 54 thus serves to intermittently open and close the circuit between the conductors 29 and 31, the spaced arrangement of the contactors 56 avoiding all possibility of arcing and consequent heating. However, if under any conditions the controller should tend to heat when in use, the construction described above is such that the casing may be filled with oil, which would not only prevent all arcing but would further maintain an even temperature within the casing.

The operation of the above-described mechanism is as follows: Current being supplied to the main power lines 34 and 35 and the motor or other power means 44 having been set in motion, the welder will be in condition to be used. It will be understood that the five-point regulator 22 will be adjusted to the condition under which it operates most satisfactorily with the particular work being operated upon. For each revolution of the shaft 50 the coils 30 are short-circuited eight times due to the contact of the eight successive contactors 56 with the corresponding contact members 64. When any one of the contactors 56 is in conducting relation with a contact member 64 the coils 30 are short-circuited and the power from the main lines 34 and 35 is conducted directly to the primary coils 18 thus setting up lines of force in the main core 12 and inducing a current in the secondary 20 as will be readily understood. This condition prevails for a length of time sufficient to heat the material to the desired degree for the particular weld being made, which time may vary considerably but which is usually a very brief period in the use for which this apparatus is intended. Each time that the circuit between the branch lines 29 and 31 is opened as when a contactor 56 is moved out of engagement with its contact member 64, the current supplied from the main line is caused to pass through the main and auxiliary primary coils 18 and 30 in series. Since the polarity of the coils 18 and 30 are the same the lines of force set up in the cores 12 and 26 at any particular instant correspond as to the direction of movement, hence the flux movements in the common limb 13 of the two magnetic circuits will be such as to buck or oppose one another and the current induced in the secondary will be correspondingly decreased. Under certain conditions as where the number of turns in the coils 30 is the same as in the main primary coils 18, the bucking or opposing of the lines of force in the limb 13 of the core will be such as to neutralize the effect on one another and the lines of force will thus be caused to assume a path threading only the outer portion of the composite cores 12, 26. The secondary voltage of the transformer will thus be reduced to approximately half of its voltage prior to the introduction of the coil 30 into the circuit, this reduction in the voltage being sufficient to so decrease the current output of the secondary of the transformer as to prevent it from performing any useful work at the high speed at which it is operating. This result, the reduction of the output of the secondary, is assisted by reason of the momentum of the current when the shunting circuit 29, 31 is being opened or closed. In other words, after the circuit between the conductors 29 and 31 has been closed to short-circuit the coil 30 and the circuit is thereafter opened by reason of a contactor 56 moving away from a contact member 64, the current flow is not instantly reduced but instead the momentum of the current causes substantially the full current flow to be applied to the coil 30 so as to produce an excessive flux passage in the core 26 and limb 13, this increased flux movement serving to reduce the flux movement in the core 12 and to correspondingly reduce the output of the secondary 20 to an extent greater than the reduction after the coil 30 has been connected in series with the coil 18 for a certain length of time.

The positioning of the controller C in the circuit 29, 31 so that it operates without disturbing the circuit from the conductor 25 through the coil 30 avoids the possibility of any severe arcing since the coil 30 thus serves to choke the arc, which might otherwise occur due to the opening of the circuit through 29, 31, when the contactor 54 is rotated.

We have thus provided a current controlling mechanism for the output of a transformer which operates without opening either the primary or secondary power circuits and which correspondingly decreases the amount of arcing at the various terminals, this mechanism permitting more rapid operation than any heretofore produced to our knowledge.

It will be understood that the mechanism may be modified in various respects without departing from the spirit of the invention, the embodiment herein disclosed being merely illustrative of one embodiment of the invention.

This application is a continuation in part of our application Serial No. 174,778, filed March 12, 1927, for means for regulating secondary current and voltage in transformers to which reference may be had for further details of the invention.

What we claim as our invention is:

1. In an electric welding apparatus, a transformer including a main magnetic core, primary and secondary windings thereon, an auxiliary magnetic core in intimate contact with said main core and having a portion of main core common to both, an auxiliary winding on said auxiliary core, means for conducting electric current to said primary and auxiliary windings and means for intermittently varying the current supply of said auxiliary winding.

2. In an electric welding apparatus, a transformer including a main magnetic core, primary and secondary windings thereon, an auxiliary magnetic core, an auxiliary winding on said auxiliary core, means for conducting electric current in series through said primary and auxiliary windings, and a power driven make and break device for intermittently and uniformly short-circuiting said auxiliary winding.

3. The combination with an alternating current electric transformer comprising a main magnetic core and main primary and secondary coils embracing portions of the same, of an auxiliary magnetic core arranged in magnetic conducting relation to a portion of said main magnetic core, an auxiliary winding on said auxiliary core and means for causing an electric current to be intermittently applied to said auxiliary winding.

4. The combination with an alternating current electric transformer comprising a main magnetic core and main primary and secondary coils embracing portions of the same, of an auxiliary magnetic core arranged in magnetic conducting relation to a portion of said main magnetic core, an auxiliary winding on said auxiliary core and means for intermittently decreasing the current supply to said main primary coil and simultaneously obstructing the flux passage through said main core.

5. In an electric welding apparatus, a transformer including a magnetic core and primary and secondary windings, auxiliary current modifying windings, conducting means connecting said auxiliary windings in series with said primary windings, intermittently operating means for short-circuiting said auxiliary winding and an auxiliary magnetic core for said auxiliary windings positioned in flux conducting relation to said first named core.

6. In an electric welding apparatus, a transformer including a magnetic core and primary and secondary windings, auxiliary current modifying windings, conducting means connecting said auxiliary windings in series with said primary windings, rotatable means shunting the current flow around said auxiliary winding, said rotatable means being formed with a plurality of spaced terminals and fixed contact members adapted to be successively engaged by said spaced terminals.

7. In an electric welding apparatus comprising a main magnetic core constituting a main flux path and main primary and secondary windings embracing the same, an auxiliary modifying primary winding positioned in non-embracing relation to said main flux path, an auxiliary flux path threading said auxiliary winding and associated in flux commingling relation to said main flux path, said main and auxiliary primary windings being connected in series relation, and means for intermittently short-circuiting one of said primary windings.

8. In an electric welding apparatus, a main magnetic core, primary and secondary windings embracing the same, an auxiliary magnetic core mounted in flux conducting relation to said main core, an auxiliary winding on said auxiliary core, said primary and auxiliary windings being connected in series relation, and means for intermittently varying the current supply to said auxiliary coil.

9. In an electric apparatus, an alternating current transformer including a current correcting coil, rotatable means for varying the output of said transformer, said means including a conductor formed with a plurality of longitudinally and circumferentially spaced contact members, and conducting means co-acting in sequence with said contact members for intermittently short-circuiting said coil.

10. In an electric welding apparatus comprising a main magnetic core constituting a main flux path and main primary and secondary windings embracing the same, electromagnetic means including an auxiliary primary winding positioned in non-embracing relation to said main flux path for directly modifying the flux flow in said main magnetic core, and means for automatically and intermittently varying the current supply to one of said primary coils.

11. The combination with a transformer having a plurality of primary coil portions normally arranged in series relation, of short-circuiting means including a rapidly operating circuit interrupter for short-circuiting a portion of said primary coils, said last-named portion remaining in closed circuit condition during the use of the transformer and constituting a shunt circuit around the interrupter contacts through which the circuit of the primary is maintained at each interruption.

12. The combination with a transformer having a main primary coil and core, parallel connections for one terminal of said coil, an auxiliary coil arranged in one of said parallel connections and an intermittently operated circuit maker and breaker in the other, and a magnetic core for said auxiliary coil having portions separate from said first named core.

Signed at Lynn, in the county of Essex and State of Massachusetts, this 10th day of March, A. D. 1927.

GEORGE A. THORNTON.
WOLCOTT REMINGTON.